US 12,420,300 B1
United States Patent — Palumbo
(10) Patent No.: US 12,420,300 B1
(45) Date of Patent: Sep. 23, 2025

(54) FLUID SPRAYING ASSEMBLY

(71) Applicant: Palumbo Services, Inc., Forest Lake, MN (US)

(72) Inventor: Joseph John Palumbo, Forest Lake, MN (US)

(73) Assignee: Palumbo Services, Inc., Forest Lake, MN (US)

( * ) Notice: Subject to any disclaimer, the term of this patent is extended or adjusted under 35 U.S.C. 154(b) by 465 days.

(21) Appl. No.: 17/930,129

(22) Filed: Sep. 7, 2022

(51) Int. Cl.
- *B05B 15/16* (2018.01)
- *B05B 15/652* (2018.01)
- *G01B 5/14* (2006.01)

(52) U.S. Cl.
CPC ............ *B05B 15/16* (2018.02); *B05B 15/652* (2018.02); *G01B 5/14* (2013.01)

(58) Field of Classification Search
CPC . B05B 15/16; B05B 12/32–36; B05B 15/652; B05B 1/28; B05B 12/18; B05B 12/20; B05B 12/22; B05B 12/24; B05B 12/26; B05B 12/40; G01B 5/14
USPC ........ 239/73, 754, 280, 280.5, 289; 73/1.79, 73/1.81, 290 R; 401/268, 269; 118/300–326; 15/1–268; 134/1–201
See application file for complete search history.

(56) References Cited

U.S. PATENT DOCUMENTS

| | | | |
|---|---|---|---|
| 1,817,311 A | 8/1931 | Hedde | |
| 2,581,678 A | 1/1952 | Malin et al. | |
| 2,676,841 A * | 4/1954 | Pohle | B05B 1/28 118/301 |
| 3,423,027 A | 1/1969 | Small et al. | |
| 4,022,382 A | 5/1977 | Engdahl, Jr. | |
| 4,641,780 A | 2/1987 | Smrt | |
| 4,892,251 A | 1/1990 | Bresnen | |
| 5,143,105 A * | 9/1992 | Katayama | B08B 9/0495 134/179 |
| 5,263,646 A | 11/1993 | McCauley | |
| 5,340,026 A | 8/1994 | Woodruff | |

(Continued)

OTHER PUBLICATIONS

"3D Printed Garden Hose Venturi Pump", electronically retrieved from https://pinshape.com/items/21723-3d-printed-garden-hose-venturi-pump (retreived Apr. 5, 2022), 2 pages.

(Continued)

*Primary Examiner* — Arthur O. Hall
*Assistant Examiner* — Juan C Barrera
(74) *Attorney, Agent, or Firm* — Westman, Champlin & Koehler, P.A.

(57) ABSTRACT

An assembly and nozzle suitable ice dam abatement and other spraying applications is disclosed. A fluid spraying assembly as disclosed can include a nozzle through which fluid can pass and having an inlet and an outlet, and a depth gauge positioned adjacent to the outlet. The nozzle can discharge the fluid out of the outlet in a spray direction during operation. The depth gauge can include a shaft and a thermal insulator. The shaft can extend from the nozzle in the spray direction, can have an elongate shape, and can have a distal end that is spaced from the outlet in the spray direction. The thermal insulator can be positioned at least at the distal end of the shaft and can be a thermal insulating ball having a diameter that is greater than a width of the shaft and smaller than a width of the nozzle at the outlet.

15 Claims, 5 Drawing Sheets

(56) References Cited

U.S. PATENT DOCUMENTS

| | | | |
|---|---|---|---|
| D375,344 S | 11/1996 | Simonette | |
| 5,579,645 A | 12/1996 | Prociw et al. | |
| 5,653,392 A | 8/1997 | Wells | |
| 5,836,344 A | 11/1998 | Hovi, Sr. | |
| 6,688,540 B1 | 2/2004 | Passarella | |
| 7,896,266 B1 | 3/2011 | Cooper et al. | |
| 7,927,033 B2 | 4/2011 | Gansebom et al. | |
| 8,210,450 B2 * | 7/2012 | Zeinstra | B05B 15/68 239/288 |
| 10,139,104 B2 | 11/2018 | Sharp et al. | |
| 10,632,495 B2 | 4/2020 | Carey et al. | |
| 2003/0178503 A1 * | 9/2003 | Horan | B05B 15/68 239/71 |
| 2006/0054720 A1 | 3/2006 | Valiton et al. | |
| 2006/0060664 A1 | 3/2006 | Valiton et al. | |
| 2010/0168686 A1 | 7/2010 | Jean-Philippe et al. | |
| 2012/0006917 A1 * | 1/2012 | Carr | B05B 15/625 239/754 |
| 2013/0048029 A1 | 2/2013 | Vercouteren | |
| 2014/0115933 A1 | 5/2014 | Faragher | |
| 2022/0018135 A1 | 1/2022 | Kahle | |

OTHER PUBLICATIONS

"Dramm 22625 Syphonject Siphon Mixer with External Check Valve", electronically retrieved from Amazon.com (retrieved Apr. 5, 2022), 9 pages.

"Arctic Blaster Steam Thawing Device", electronically retrieved from https://cleanflow.net/products/arctic-blaster-steam-thawing-device (retrieved Apr. 4, 2022), 2 pages.

"General Pump TriKleener Water Broom—14in. Width, 4000 PSI, 4.0 GPM, Model# 2100369", electronically retrieved from https://www.northerntool.com/shop/tools/product_200517714_200517714 (retrieved Apr. 7, 2022), 2 pages.

"Multipurpose Submersible Water V-Pump w/ 4' Hose", electronically retrieved from https://www.poolsupplies.com/product/multipurpose-submersible-water-vpump-w-4-hose (retrieved Apr. 5, 2022), 2 pages.

"NorthStar Gas Wet Steam & Hot Water Pressure Washer—3000 PSI, 4.0 GPM, Honda Engine", electronically retrieved from https://www.northerntool.com/shop/tools/product_200324565_200324565 (retrieved Apr. 20, 2022), 9 pages.

"Optimized Process: Affordable Solutions and Powerful Ideas", electronically retrieved from https://www.nobox7.com/ (retrieved Apr. 4, 2022), 3 pages.

Ice Dam Guys, "How to Remove An Ice Dam Properly", electronically retrieved from https://www.youtube.com/watch?v=MXQ9PuThUH4&t=1s (Aug. 19, 2017), 1 page.

Ice Dam Guys, "How to Remove Ice Dams", electronically retrieved from https://web.archive.org/web/20200925195606/https://www.icedamremovalguys.com (archived Sep. 25, 2020), 5 pages.

Ice Dam Guys, "Off-the-Shelf Ice Dam Steamers Vs. Custom-Equipped Ice Dam Steamers: What to Know If You Need Ice Dam Removal", electronically retrieved from https://web.archive.org/web/20200925194830/https://www.icedamremovalguys.com (archived Sep. 25, 2020), 19 pages.

Ice Dam Guys, "Off-the-Shelf Ice Dam Steamers Vs. Custom-Equipped Ice Dam Steamers: What to Know If You Need Ice Dam Removal", electronically retrieved from https://web.archive.org/web/20220210184822/https://www.icedamremovalguys.com (archived Feb. 10, 2022), 19 pages.

Ice Dam Steaming Association for Education: IDSAFE, "How to Choose the Right Ice Dam Removal Equipment", electronically retrieved from https://www.icedamsteamingassociationforeducation.com/how-to-choose-the-right-ice-dam-removal-equipment (retrieved Apr. 20, 2022), 3 pages.

Ice Dam Steaming Association for Education: IDSAFE, "Ice Dam Steaming Tips", electronically retrieved from https://www.icedamsteamingassociationforeducation.com/ice-dam-steaming-tips (retrieved Apr. 4, 2022), 4 pages.

NOBOX7, "Steam Machete Pressure Washer Nozzle Attachment", electronically retrieved from https://www.youtube.com/watch/v=2OpxQtC3VUw (Jan. 6, 2020), 2 pages.

American Pressure Inc, "Steam Nozzles Are the Best On Ice Dams.", dated Feb. 13, 2019, electronically retrieved from https://americanpressureinc.com/2019/02/13/steam-nozzles-are-the-best-on-ice-dams, 3 pages.

American Pressure Inc, "The Steam Nozzle Is Very Important", dated Mar. 26, 2019, electronically retrieved from https://americanpressureinc.com/2019/03/26/steam-nozzle-important/#:~:text=Steam%20Nozzles%20are%20the%20best,all%20vapor(Dry%20Steam), 3 pages.

Joseph John Palumbo, "Declaration for Information Disclosure Statement," Dated Aug. 27, 2022, 7 pages.

* cited by examiner

FLUID SPRAYING ASSEMBLY

FIELD

The present invention relates generally to fluid spraying assemblies, a nozzle thereof, and associated methods of making and using the same.

BACKGROUND

Fluid sprayers, such as steaming devices and pressure washers, are used in a variety of contexts for cleaning and the abatement of unwanted materials. In some applications, these devices use relatively high-temperature fluids, such as steam, and components of the device to become hot during use. Both the hot fluid and the hot components of the fluid spraying device can pose risks of damage to nearby objects. Use of pressurized fluids can also pose risk of damage to nearby objects, whether that fluid is relatively hot or relatively cool. Furthermore, these fluid spraying devices are sometimes used in settings where an operator has limited mobility and/or risk of falling, such as on the roof of a building covered in snow and ice. The use of relatively hot and/or pressurized fluids and spraying device components combined with difficult site conditions place a burden on device operators to work safely and avoid damage to surrounding objects while still performing the desired cleaning or material abatement operation in a relatively efficient manner.

One example of a challenging material abatement operation is ice dam abatement. Residential homes and other buildings in cold climates can accumulate snow and ice on their roofs. Heat from within the building can rise and cause melting of the snow and ice present on certain portions of the roof despite outdoor temperatures being below the freezing point. Such meltwater then runs down the slope of the roof toward eaves or other roof overhangs where temperatures at or near the exterior roof surface are below the freezing point. Upon reaching cooler portions of the roof, the meltwater can refreeze. This melting and refreezing process can result in an accumulation of ice that forms an ice dam. This ice dam can limit or prevent liquids, including additional meltwater, from draining off the roof. Liquid can pool above the ice dam and eventually penetrate underneath asphalt shingles or other roofing materials, causing leakage into interior spaces of the building. When there is a considerable amount of snow or ice on a roof, the amount of water that can accumulate above an ice dam can be substantial. Water leaking into a building as a result of an ice dam can cause significant damage. Ice dams can be large and dense, however, and are difficult to mitigate, reduce in size, or eliminate without causing damage to the roof, particularly the roofing materials (e.g., shingles, waterproof membranes, painted steel sheeting) on which the ice dam has formed. Steam spraying devices have been utilized to perform ice dam abatement on roofs, with steam generated by a device positioned on the ground and delivered by a hose to a spraying nozzle (usually at the end of a wand or lance). However, existing sprayer devices have limitations, including requiring a relatively high level of operator skill to avoid damaging a roof while steaming an ice dam. There are also unique challenges involved in spraying a hot fluid on a sloped roof in cold conditions while the operator is on a slippery roof surface or ladder maneuvering a hose and aiming a spray nozzle. Under such conditions, the operator may experience fatigue, reduced manual dexterity due to cold ambient temperatures, and difficulty maintaining his or her balance to avoid slipping or falling, any or all of which can make such ice dam abatement fluid spraying operations difficult. Moreover, because of the cold, loss of balance, fatigue, etc., the operator of a steamer or pressure washer can lose control over the distance that the spray nozzle is away from the substrate, causing damage to the substrate through by melting, peeling, or the like due to the nozzle temporarily being too close to the surface.

Other approaches to ice dam abatement include the use of chemicals or mechanical chipping or scraping. However, it may be undesirable for chemical agents to contact roofing materials, and such chemical agents may work relatively slowly on ice dams. Even where effective in breaking through an ice dam, chemical treatments may provide only partial and/or temporary abatement, such as creating only small channels through or under an ice dam that relatively quickly re-freezes as a re-formed ice dam. Mechanical chipping and scraping can pose considerable risk of damaging (e.g., puncturing) roofing materials, exacerbating the risk or damage caused by liquid penetrating the roof.

Thus, it is desired to provide an improved fluid spraying assembly, an improved nozzle for such an assembly, and associated methods of making and using the same.

SUMMARY

Disclosed embodiments of the present invention provide a fluid spraying assembly, a nozzle thereof, and associated methods of making and using the same.

In one aspect, a fluid spraying assembly includes a nozzle through which fluid can pass having an inlet and an outlet, and a depth gauge positioned adjacent to the outlet of the nozzle. The nozzle can discharge the fluid out of the outlet in a spray direction during operation. The depth gauge includes a shaft and a thermal insulator. The shaft extends from the nozzle in the spray direction, has an elongate shape, and has a distal end that is spaced from the outlet of the nozzle in the spray direction. The thermal insulator is positioned at least at the distal end of the shaft, and can be a thermal insulating ball having a diameter that is greater than a width of the shaft and smaller than a width of the nozzle at the outlet.

In another aspect, a fluid spraying assembly includes a nozzle through which fluid can pass, a lance shaft fluidically connected to the nozzle, an elbow joint located adjacent to the nozzle and fluidically connected between the nozzle and the lance shaft, a thermal insulator extending outward from the elbow, and a collar surrounding a portion of the nozzle adjacent to the outlet. The nozzle has an inlet and an outlet, and the nozzle can discharge the fluid out of the outlet during operation. The elbow joint positions the nozzle at an obtuse angle relative to the lance shaft. The elbow joint can be made of a metallic material and the collar can be made of a polymer material.

In yet another aspect, a steam spraying nozzle includes a barrel having a proximal end, a distal end, and an inner fluid passage, and a sprayer tip cap at the distal end of the barrel. The inner fluid passage has an exit at the distal end of the barrel, an upstream portion having a maximum first diameter, and a downstream portion having a second diameter at the exit that is larger than the first diameter. The sprayer tip cap has an outlet to spray steam out of the nozzle during operation and an interior surface. The outlet is positioned adjacent to the exit of inner fluid passage of the barrel in fluidic communication with the inner fluid passage of the barrel. The outlet is substantially cylindrical and a third diameter of the outlet is smaller than the second diameter of the downstream portion of the inner fluid passage of the barrel. The interior surface of the sprayer tip cap surrounds the outlet and faces upstream.

The present summary is provided only by way of example, and not limitation. Other aspects of the present invention will be appreciated in view of the entirety of the present disclosure, including the entire text, claims and accompanying figures.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

Ice dam abatement using fluid spraying devices can pose certain competing problems. On the one hand, it is desired to avoid damaging a roof during fluid spraying operations. This tends to suggest using lower temperature and pressure fluids, which are less likely to damage roof materials through high temperature melting or scorching and less likely to abrade or cut through roofing materials due to impingement by the flow of high-pressure fluid. However, relatively low temperature and/or pressure fluids have a reduced ability to melt and/or cut through snow and ice. Ice dams can be made of relatively dense ice. Moreover, using a fluid spraying nozzle that has a relatively large spray pattern tends to lower the pressure of the sprayed fluid by spreading the hot fluid over a greater area. But a large spray pattern limits the ability of an operator to cut through ice in a focused manner, limiting the operator to a more gradual melting process. Such spray patterns may also provide only limited fluid delivery in a central portion of the spray pattern. Melting and cutting away ice that forms an ice dam with relatively low temperature and/or pressure fluid sprays therefore takes a relatively long time. In a sense, devices with large spray patterns that produce relatively low-pressure fluid sprays simply limit the range of options available to an operator. Such devices may reduce the risk of damage to a roof but at the same time can greatly increase the time to complete the cleaning or abatement operation. This loss of efficiency is another problem unto itself. For instance, the cost to a homeowner to have an ice dam remediated by a professional service provider is generally proportional to the amount of time involved to complete the operation. In this way, existing fluid spraying devices make ice dam abatement operations less dependent on operator skill by operating on an essentially fixed low-efficiency, low-pressure spray basis, which trades reduced risk of damage to roof materials against greatly increased ice dam abatement completion time (that usually translates into increased service costs to the homeowner). But even when existing devices seek to reduce risk of damage directly caused by flows of relatively hot, pressurized fluid, such devices still include components such as metal nozzles that can become very hot during use. Such hot components can cause damage to nearby objects that they contact, such as by scorching or melting roofing materials, apart from risks from the flowing fluid itself. Thus, it is desired to provide a fluid spraying apparatus that reduces risks of damage to nearby objects without significantly reducing ice dam abatement efficiency.

In general, a fluid spraying assembly according to embodiments of the present invention can allow spraying of hot, pressurized fluids (including gasses, liquids, and mixtures of gas and entrained liquid droplets), with reduced risk of damage to nearby objects but without significant reduction in fluid pressurization or spraying operation efficiency. In one aspect, a depth gauge is provided that provides a standoff that spaces a tip of a nozzle that discharges the fluid away from nearby surfaces or objects. The depth gauge is adjustable in some embodiments, and can include a thermal insulator, such as a thermal insulator ball or knob, at least at a distal end. In another aspect, a collar and/or or an elbow thermal insulator can be provided to help reduce a risk of hot fluid spraying assembly components contacting nearby surfaces or objects, and/or to help reduce frictional wear. In yet another aspect, a fluid spraying nozzle is provided with a barrel and a sprayer tip cap. The barrel can have an inner passage for primary fluid flow that has multiple stages or portions increase in diameter in the downstream direction, while the sprayer tip cap has an outlet that is smaller in diameter than the most downstream portion or stage of the inner passage of the barrel. In some embodiments, a sprayer-adapter with an inlet can spray fluid into the inner passage, such as in a fan-shaped pattern, which can be created with the aid of a groove adjoining the inlet in some embodiments. In some embodiments, a vent is provided in the nozzle (e.g., in the barrel) that fluidically connects the inner passage to ambient air, such as at a rear or upstream end of the nozzle generally opposite the distal or discharge end of the nozzle. Disclosed embodiments of such a nozzle can promote efficient spraying of steam (with or without entrained water droplets) for ice dam abatement applications, for example. Other features and benefits of the present invention will be appreciated by those of ordinary skill in the art in view of the entirety of the present disclosure, including the accompanying figures.

Figure 1:
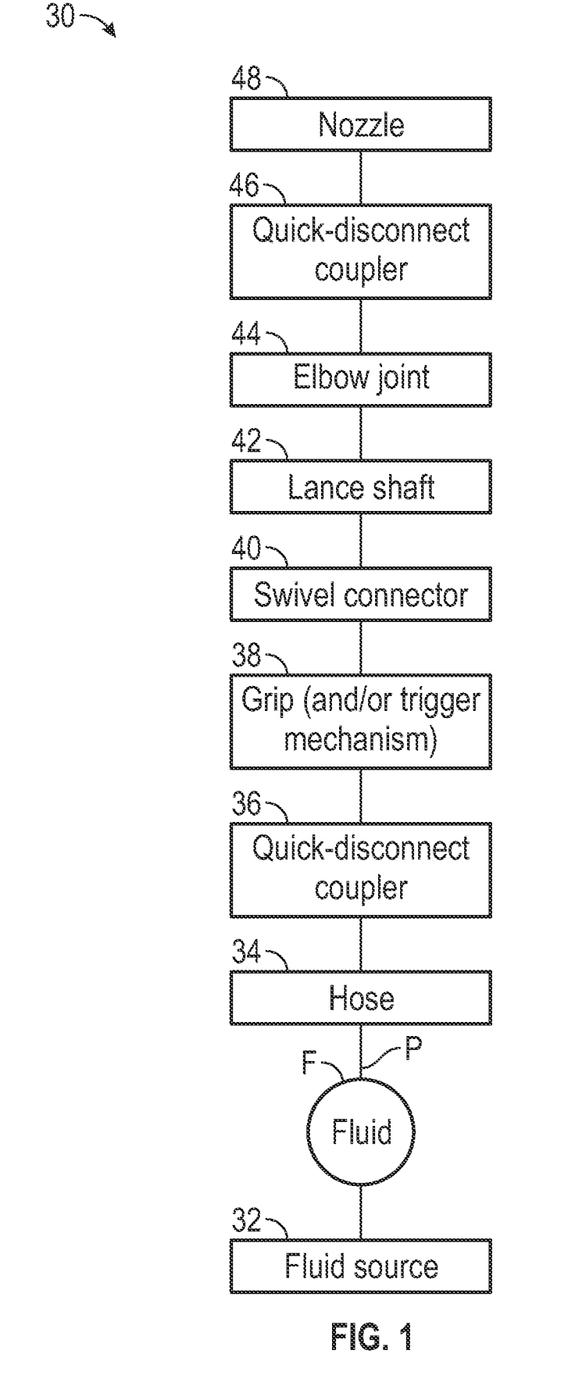
FIG. 1 is a schematic block diagram of an embodiment of a primary fluid flow path of a fluid spraying assembly.

FIG. 1 is a schematic block diagram of an embodiment of a primary fluid flow path P of a fluid spraying assembly 30. As shown in the embodiment of FIG. 1, the assembly 30 includes a fluid source 32 capable of supplying a fluid F, a hose 34, a quick-disconnect coupler 36, a grip (and/or trigger mechanism) 38, a swivel connector 40, a lace shaft 42, an elbow joint 44, a quick-disconnect coupler 46, and a nozzle 48. In the illustrated embodiment, components of the assembly 30 in the primary fluid flow path P are fluidically connected together in series. It should be noted that FIG. 1 is a highly simplified schematic representation that illustrates only some of the components of the assembly 30, particularly those that are part of the primary fluid flow path P used to deliver the fluid F for spraying operations. Other components may be utilized in some embodiments that are not specifically shown in FIG. 1, which is provided merely by way of example and not limitation.

The fluid source 32 can generate or otherwise supply the fluid F to be used by the assembly 30 for spraying operations. The fluid F can be gas, liquid, or a combination of gas and liquid (such as gas with entrained liquid droplets). The presence of entrained solid particulates with the fluid F is also possible, though in typical embodiments the fluid F can be substantially free of solid particulates. The fluid F can also be a relatively high temperature, pressurized fluid. For example, in one embodiment, the fluid F can be steam, and can optionally further include entrained liquid water droplets. The use of steam as the fluid F is particularly helpful for ice dam abatement operations, and the presence of entrained liquid water droplets in the steam-sometimes referred to as "wet" steam as opposed to "dry" steam without a significant amount of entrained liquid water can be helpful for ice dam abatement operations. Steamers, pressure washer/steamer combo units, or pressure washers can be utilized as the fluid source 32, for example. For example, the NorthStar® Gas Wet Steam & Hot Water Pressure Washer (model no. 157310) available from Northern Tool & Equipment Company (Burnsville, MN), the Arctic Steamer® available from American Pressure, Inc. (Robbinsdale, MN), and a Hydro Tek HD Series™ pressure steamer available from American Cleaning Systems (Columbia, MO) are all commercially-available units that allow for steam to be generated for use with the assembly 30. Though nearly any combustion, electric, or combination combustion/electric units capable of generating hot, pressurized fluids such as steam can be utilized in further embodiments.

The hose 34 can be a high-pressure capable flexible hose, such as a commercially available ⅜-inch steel braided rubber hose with a quick coupler fitting at one or both ends. In further embodiments nearly any suitable hose or piping can be utilized. The hose 34 can transfer the fluid F from the fluid source 32 to downstream components while permitting flexible movement of a portion of the primary fluid flow path P of the assembly 30. During ice dam abatement operations, for instance, the fluid source 32 can be positioned on the ground or other low-elevation location while the hose 34 carries the fluid F to a distant, elevated location on or near a roof of a building or similar structure where an ice dam is present.

The quick-disconnect coupler 36 can be used to connect the hose 34 to the grip (and/or trigger mechanism) 38. Such quick-disconnect couplers are well-known for use with fluid-carrying component connections. Though, in alternate embodiments, threaded or other types of couplings or connections can be utilized instead.

The grip (and/or trigger mechanism) 38 can be connected to the hose 34 via the quick-disconnect coupler 36. Use of a gun-style grip of a type commonly used with steamers, pressure washers, and pressure washer/steamer combo units can provide a suitable hand grip to help an operator manually direct a spray of the fluid F in a desired direction. In one embodiment, the grip 38 can be an open spray gun (that is, a triggerless spray gun). However, other types of grips can be utilized in alternative embodiments. A trigger mechanism can optionally be used with the grip 38 in further embodiments. Such a trigger mechanism can allow the operator to control flow of the fluid F at a location spaced downstream from the fluid source 32 along the primary fluid flow path P, including to shut off flow of the fluid F at the trigger mechanism. For instance, a NorthStar® trigger spray gun (Model No. DGR5010P) available from Northern Tool & Equipment Company (Burnsville, MN) can be utilized in some embodiments. In embodiments in which a trigger mechanism is utilized, an unloader valve can be utilized to reduce a risk of over-pressurization and/or excessive heating of the fluid F upstream from the trigger mechanism beyond desired limit(s), when the trigger mechanism limits or shuts off flow of the fluid F.

The swivel connector 40 can be connected between the grip (and/or trigger mechanism) 38 and the lance shaft 42, and can provide both a mechanical and fluidic connection between those components. In one embodiment, the swivel connector 40 is a Fastenal® ¼ Super Swivel 1204-FB compression connector, available from Fastenal Company (Winona, MN). Such an embodiment of the swivel connector 40 can have a tensioner or compression mechanism that restricts swiveling action. In this way, the lance shaft 42 (and downstream components of the assembly 30 connected to the lance shaft 42) can be selectively rotationally swiveled relative to the grip (and/or trigger mechanism) 38 by an operator but will remain generally rotationally stable relative to each other in the absence of operator action. In other words, the swivel connector 40 does not freely permit rotational swiveling, but instead provides limited rotational swiveling only as desired by the operator. An optional swivel lock can be provided in or with the swivel connector 40 in some embodiments. Having the swivel connector 40 positioned between the grip and/or trigger mechanism 38 and the lance shaft 42, such as directly between and linking those components, can allow an operator holding the grip and/or trigger mechanism 38 to easily reach the lance shaft 42 to make desired rotational swiveling movements in a controlled manner, and also the grip and/or trigger mechanism 38 can remain in a relatively stable position or orientation while other components are moved through rotation of the swivel connector 40. Though in alternative embodiments the swivel connector 40 could be positioned elsewhere along the primary fluid flow path P, such as further downstream toward the elbow joint 44, or can be omitted entirely.

The lance shaft 42 can be an elongate rigid tube located in close proximity to the grip and/or trigger mechanism 38. For instance, in one embodiment the lance shaft 42 is a GP General Pump® insulated, chrome-plated steel lance (Model No. NDL47ICSP), 48 inches in length and ¼ inch in diameter, with an insulating sleeve, available from GP Companies, Inc. (Mendota Heights, MN). The lance shaft 42 can transport the fluid F downstream from the grip and/or trigger mechanism 38 toward the nozzle 48. The rigid construction of the lance shaft 42 can allow an operator more control over the positioning of the nozzle 48 and other downstream components of the assembly 30. Moreover, in combination with limited swivel rotation permitted by the swivel connector 40 in some embodiments, the lance shaft 42 and further downstream components of the primary fluid flow path P can be essentially rigidly connected together to move together when the operator moves the grip and/or trigger mechanism 38, while the hose 34 can be flexible to allow movement of downstream components relative to the fluid source 32.

The elbow joint 44 can be connected to a distal or downstream end of the lance shaft 42. In some embodiments the elbow joint can be a metallic (e.g., stainless steel) pipe fitting, such as a McMaster-Carr part no. 90691A111 pipe fitting that can be threadably engaged with the lance shaft 42. The elbow joint 44 creates an angle A in the primary fluid flow path P (see also, e.g., FIGS. 2A and 2B). In some embodiments, the angle A defined by the elbow joint 44 is an obtuse angle, for example, 135°. In combination with the lance shaft 42 and downstream components of the assembly 30, the elbow joint 44 can provide a hockey stick-like appearance to a generally rigid assembly movable by an operator holding the grip 38. The angle A of the elbow joint 44 can help an operator more easily position the nozzle 48 to spray the fluid F in a desired direction, and an obtuse angle can be particularly useful when using the assembly 30 for ice dam abatement on a roof of a building, for instance. However, in further embodiments other angles are possible, or the elbow joint 44 can be omitted entirely.

The quick-disconnect coupling 46 can be an additional mechanical and fluidic coupling that can be located along the primary fluid flow path P immediately upstream of the nozzle 48. In this way, the quick-disconnect coupling 46 allows the nozzle 48 to be easily removed from the primary fluid flow path P, such as to swap out different style nozzles as desired for particular aspects of spraying operations. In some embodiments, a female element of the quick-disconnect coupler 46 can be a GP General Pump® stainless steel, ⅜-inch quick coupler (Model No. ND10074P), made by GP Companies, Inc. (Mendota Heights, MN) and a male portion engageable with the coupler 46 can be a custom portion of the nozzle 48 (as explained further below). Though in alternate embodiments threaded or other types of couplings or connections can be utilized instead.

The nozzle 48 is generally the most downstream component in the primary fluid flow path P of the assembly 30. The nozzle 48 is the component of the assembly 30 that discharges a spray of the fluid F during operation. An orientation of the nozzle 48 relative to the lance shaft 42 can be determined by the angle A of the elbow joint 44, if present, and rotation of the swivel connector 40 can rotate the lance shaft 42, the elbow joint 44, and the nozzle 48 as an essentially rigid unit relative to the grip 38, with the presence of the elbow joint 44 causing such rotation (e.g., by approximately) 180° to change the spray direction in which the fluid F is discharged from the nozzle 44 (see, e.g., FIG. 2A). Inventive aspects of a presently-disclosed nozzle 48 and its use are discussed further below.

It should be noted that various components along the primary fluid flow path P of the assembly 30 as shown in FIG. 1 can be combined or integrated together in further embodiments. For instance, one or more such components can optionally be integrated into a single monolithic component, such as providing a combined lance shaft and elbow joint unit. Component integration could be provided by welding or brazing, or by casting, molding, or other similar manufacturing operations.

Figure 2A:
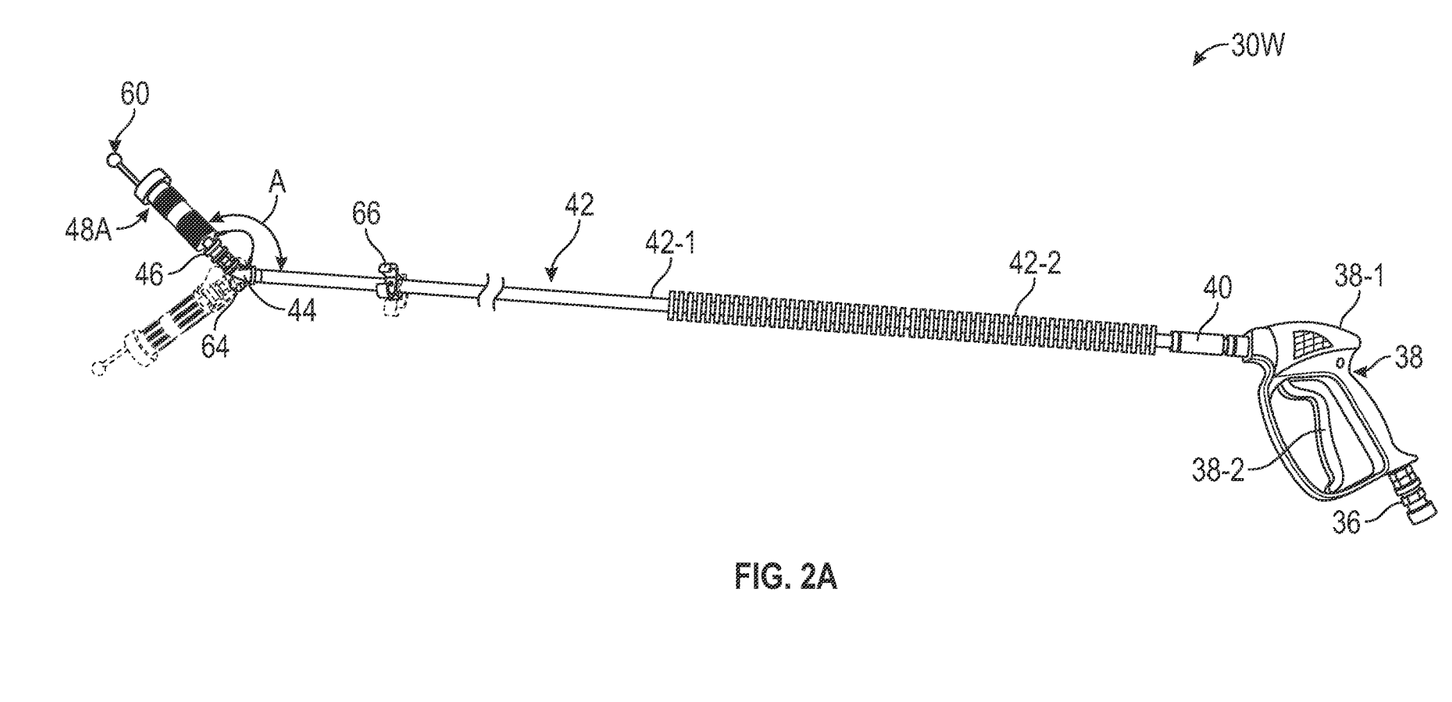
FIG. 2A is a side elevation view of an embodiment of a fluid spraying assembly, with an alternate position shown in phantom.
Figure 2B:
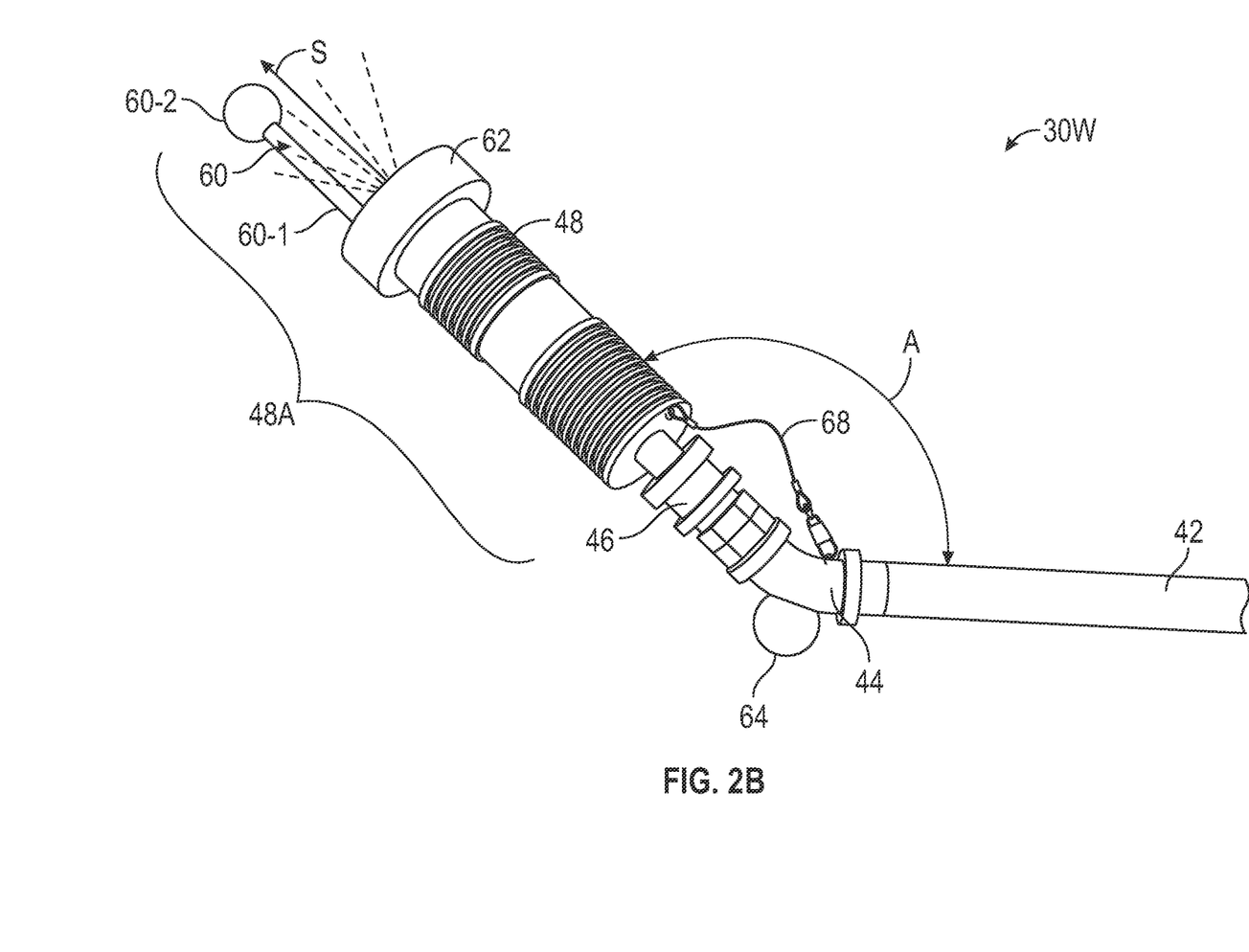
FIG. 2B is an enlarged view of a portion of the fluid spraying assembly of FIG. 2A.
Figure 3:
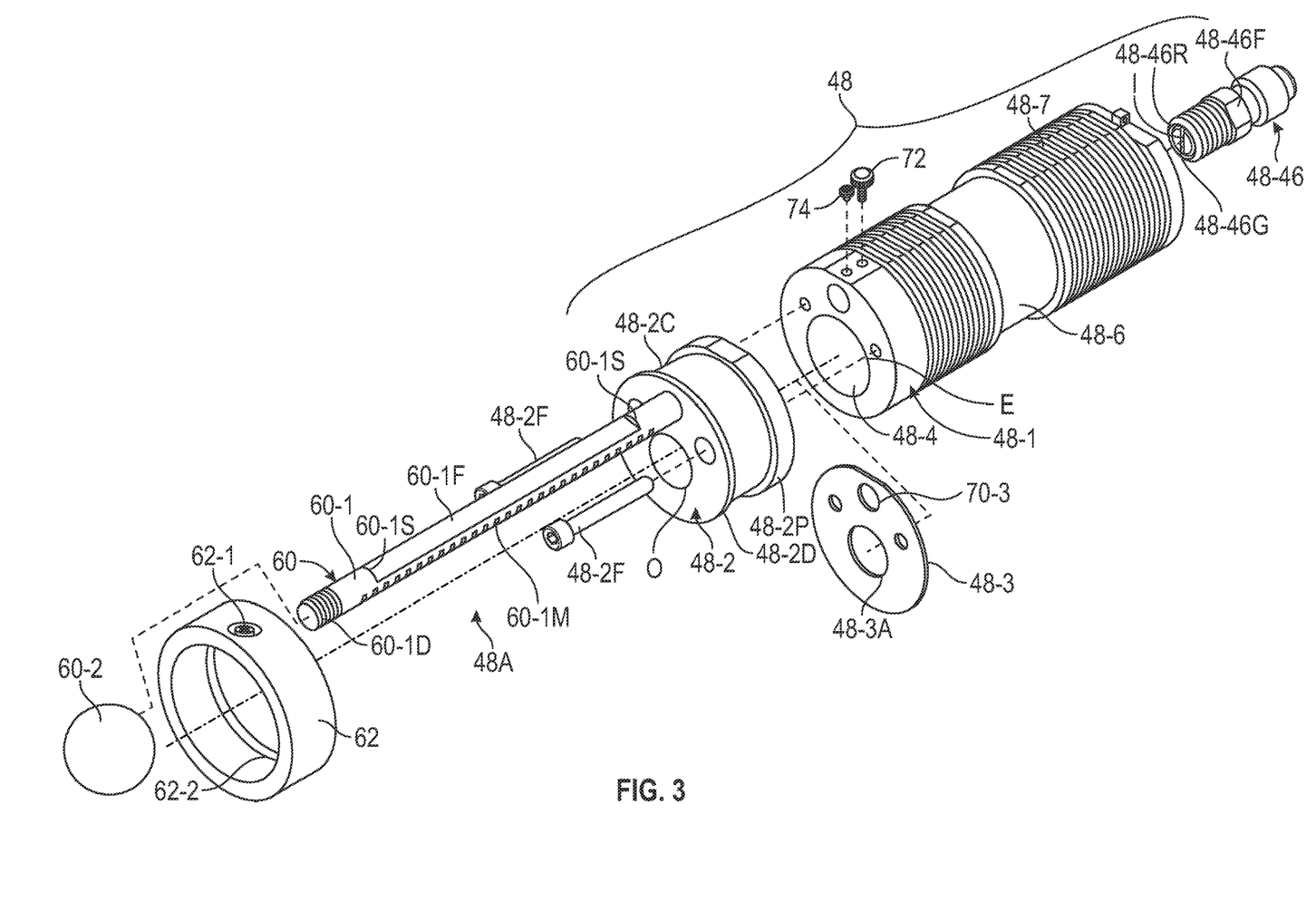
FIG. 3 is an exploded perspective view of a nozzle assembly of the fluid spraying assembly of FIG. 2.
Figure 4:
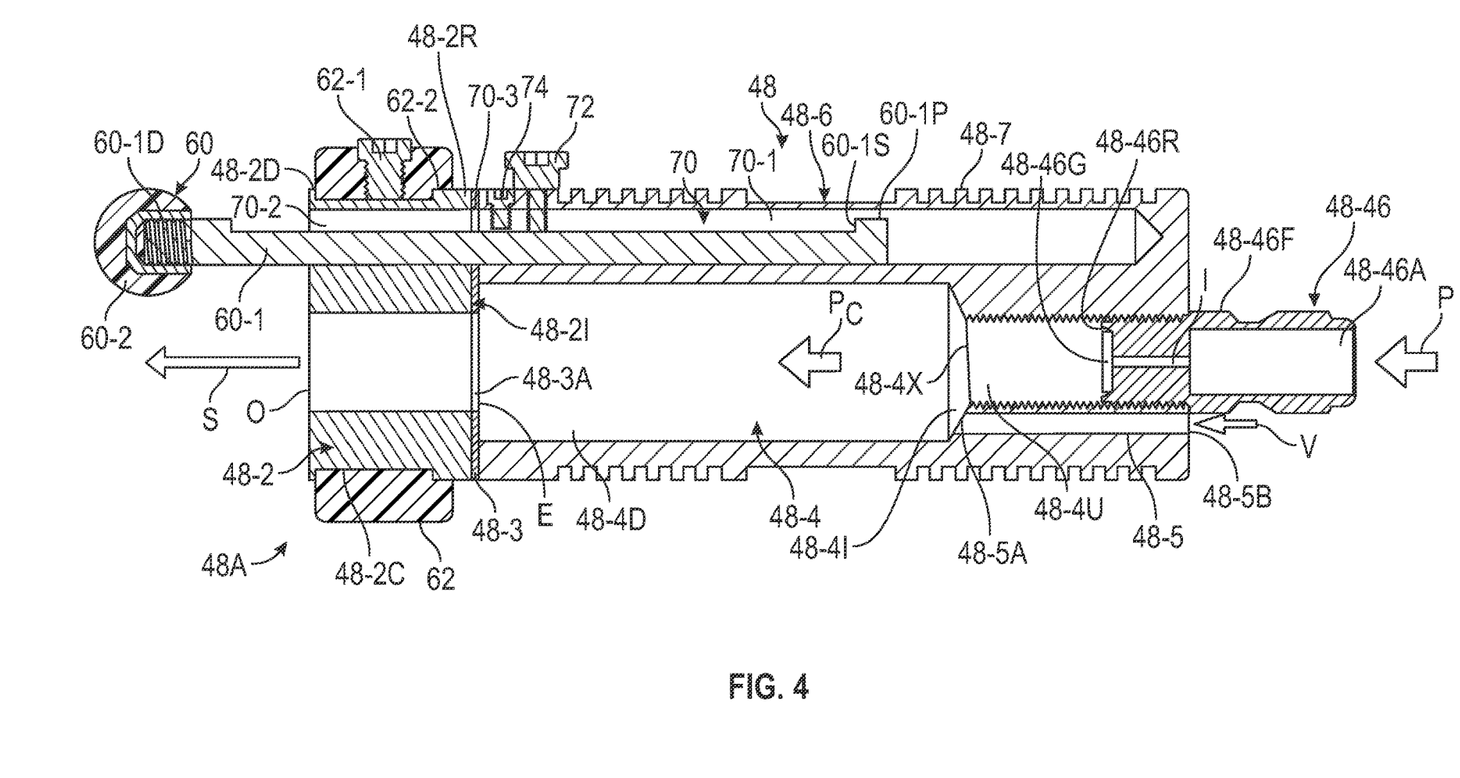
FIG. 4 is a cross-sectional view of the nozzle assembly of FIG. 3.

FIG. 2A is a side elevation view of an embodiment of a fluid spraying assembly 30W, with an alternate position shown in phantom and an unshown portion indicated with break lines, and FIG. 2B is an enlarged view of a portion of FIG. 2A. FIG. 3 is an exploded perspective view of an embodiment of a nozzle assembly 48A of the fluid spraying assembly 30W and FIG. 4 is a cross-sectional view of the nozzle assembly 48A shown in FIGS. 2A, 2B, and 3. The fluid spraying assembly 30 can be implemented as a generally downstream wand portion of the assembly 30 described above, and therefore like reference numbers are utilized to denote like parts.

As shown in FIG. 2A, for instance, the fluid spraying assembly 30W includes a coupler 36 (e.g., a female quick-disconnect coupler element engageable with a hose coupler element), a grip 38, a swivel connector 40, a lance shaft 42, an elbow joint 44, a coupler 46 (e.g., a female quick-disconnect coupler element engageable with a portion of the nozzle 48), a nozzle assembly 48A (that includes a nozzle 48, a depth gauge 60, and a collar 62), an elbow thermal insulator 64, a clip 66, and a tether 68.

The grip 38 as shown in FIG. 2A includes a gun-style grip body 38-1 and a trigger mechanism 38-2. The trigger mechanism 38-2 allows control of flow of the fluid F through the grip 38.

The lance shaft 42 in the illustrated embodiment of FIG. 2A includes a tube 42-1 and an insulating sleeve 42-2. As depicted in FIG. 2A, an unshown portion of the tube 42-1 of the lance shaft 42 is indicated with break lines, in order to for the drawing to better fit on a single page. The tube 42-1 conveys the fluid F during operation. The insulating sleeve 42-2 provides a hand grip area on at least a portion of the tube 42-1 for an operator to grasp and manually rotate or otherwise move the lance shaft 42 even when the fluid F heats the tube 42-1. Rotation of the lance shaft 42 relative to the grip 38 can occur at the swivel connector 40, which can limit rotation such that the lance shaft 42 is substantially rotationally stable relative to the grip 38 in the absence of operator action.

The elbow joint 44 positions the nozzle assembly 48A at an angle A (e.g., approximately 135°) relative to the lance shaft 42. As shown in FIG. 2A, the elbow joint 44 is connected to the tube 42-1 of the lance shaft 42 in a rigid and substantially rotationally fixed manner, such that rotation of the lance shaft 42 about an axis defined by the swivel connector 40 causes the elbow joint 44 to co-rotate with the lance shaft 42 at all times. In some embodiments, the elbow joint can be a stainless steel ¼ inch pipe fitting with a maximum exterior dimension (diameter) at either end of approximately 0.89 inches with a slightly smaller diameter middle section. The elbow joint 44 can optionally include a gusset. As discussed further below, the tether 68 can be secured to the elbow joint 44, such as to an opening through the gusset.

The elbow thermal insulator 64 extends from the elbow 44 substantially opposite the side where the angle A is defined. In this sense, when the angle A is an obtuse angle that angles the nozzle assembly in a first direction, the elbow thermal insulator 64 can extend in a generally opposite second direction. In the illustrated embodiment, the elbow thermal insulator 64 is a single thermal ball (or knob) secured to the elbow joint 44 with a threaded stud (not visible), such as a metallic (e.g., stainless steel) threaded stud or set screw that threads into a suitable hole in the elbow joint 44. In some embodiments, the elbow thermal insulator 64 can be a generally spherical ball made of a polymer (e.g., nylon) with a metallic (e.g., brass) threaded insert, though the ball can have one or more flat or otherwise non-spherical surfaces and can optionally include a protruding shank. For instance, the elbow thermal insulator 64 can be a nylon ball with an approximately ²⁵⁄₃₂-inch diameter that is fixedly and rigidly secured to the elbow joint 44. In some embodiments, the elbow thermal insulator 64 can be a single ball with a diameter that is approximately equal in diameter to a diameter or width of an immediately adjacent portion of the elbow joint 44. Moreover, in some embodiments, the elbow thermal insulator 64 can protrude outward from the elbow joint 44 a distance that is equal to or greater than an outermost portion of the nozzle 48 (measured in the same direction) and further, in some embodiments, the elbow thermal insulator 64 can protrude outward from the elbow joint 44 a distance that is equal to or greater than a diameter of the collar 62. Outward protrusion of the elbow thermal insulator 64 from the elbow joint 44 helps to enhance the thermal insulation/isolation effect in conjunction with ambient air. In further embodiments, the elbow thermal insulator 54 could have other shapes, such as a ski-like shape, and could wrap around part or all of the elbow joint 44 like a collar, or could include a rolling element.

Moreover, the elbow thermal insulator 64 can act as a contact point, allowing the assembly 30W to rest upon, pivot upon, and/or slide along a substrate (e.g., asphalt shingles on a roof) during operation while still providing a degree of thermal isolation between the substrate and hot components of the assembly 30W. The elbow thermal insulator 64 can remain in physical contact with a substrate while the nozzle 48 is repositioned to spray the fluid F in other directions or at other areas, for instance. Use of a thermal ball for the elbow thermal insulator 64 in some embodiments also helps to reduce or minimize the size of a contact area between the elbow thermal insulator 64 and the substrate, which helps reduce frictional resistant to sliding the assembly 30W. Use of a relatively durable thermoset polymer allows the elbow thermal insulator 64 to thermally insulate nearby objects from the elbow joint 44 when in use but also to withstand abrasion from contact with relatively rough objects like asphalt shingles.

The nozzle assembly 48A is removably connected to the elbow joint 44 with the quick-disconnect coupler 46, as shown in the illustrated embodiment. In the illustrated embodiment, the nozzle assembly 48A includes the nozzle 48, the depth gauge 60, and the collar 62. Though in alternative embodiments, the depth gauge 60 and/or the collar 62 could be omitted. The nozzle 48 can be the most downstream component in the primary fluid flow path P of the assembly 30, and can be the component that discharges a spray of the fluid F in a spray direction S. The depth gauge 60 can extend from the nozzle 48, generally in the spray direction S (and/or axially with respect to the nozzle 48), to provide a standoff distance between the nozzle 48 and objects that are in the field of the spray of the fluid F. In the illustrated embodiment, the depth gauge 60 is a single elongated component that is adjustable to allow an operator to select a desired standoff distance. The collar 62 extends partly or entirely around the nozzle 48 at or near the downstream or distal end of the nozzle, and the collar 62 can protrude outward (e.g., radially outward) from the nozzle 48A. Additionally details of the nozzle 48, the depth gauge 60, and the collar 62 are discussed further below.

In the illustrated embodiment, the nozzle 48 includes a barrel 48-1, a sprayer tip cap 48-2, an optional gasket 48-3, and a sprayer-adapter 48-46. The fluid F can enter an upstream or proximal end of the nozzle 48 from the quick-disconnect coupler 46 and the elbow joint 44, or other fluid supply. The sprayer-adapter 48-46 can engage an element of the quick-disconnect coupler 46 (e.g., a female element of the coupler 46) at the upstream or proximal end of the nozzle 48, and includes an inlet I. The barrel 48-1 is fluidically connected to the sprayer-adapter 48-46 in the illustrated, such that the fluid F can pass from the inlet I of the sprayer-adapter 48-46 to the barrel 48-1. Though in alternative embodiments, the inlet I could be integrated into the barrel 48-1 and the sprayer-adapter 48-46 could instead be a conventional quick-disconnect element connected to the barrel 48-1 in any suitable manner. The sprayer-adapter 48-46 and the barrel 48-1 can each be made of a metallic material, such as aluminum for the barrel 48-1 and stainless steel for the sprayer-adapter 48-46.

The sprayer-adapter 48-46 can have a quick-disconnect engagement formation at a proximal or upstream end, such as an external male quick-disconnect formation that can engage with a female element of the coupler 46, and threads at a distal or downstream end to permit threaded coupling with the barrel 48-1. Tooling flats 48-46F can also optionally be provided on the sprayer-adapter 48-46. An upstream end of the sprayer-adapter 48-46 can have an internal passage 48-46A of a size comparable to that of the mating element of the coupler 46 (e.g., ⅜ inch) that effectively functions as part of the primary fluid flow path P through the coupler 46. The inlet I is located at the downstream end of the sprayer-adapter 48-46 and has a diameter $D_I$. In the illustrated embodiment, the inlet I is substantially cylindrical in shape and the diameter $D_I$ of the inlet I is significantly smaller than a diameter of the internal passage 48-46A, and the diameter $D_I$ is much smaller than a length of the inlet I in the flow direction of the primary fluid flow path P (e.g., the diameter $D_I$ can be approximately 10-20% of the length of the inlet I). Moreover, as shown in the illustrated embodiment, the diameter of the primary fluid flow path P encounters a step-wise reduction at the inlet I (e.g., encountering a generally planar rearward face oriented essentially normal to the flow direction of the primary fluid flow path P), thus creating a converging portion of the primary fluid flow path P at the inlet I. The diameter $D_I$ and length of the inlet I are shown in the illustrated embodiment merely by way of example and not limitation. Different sizes of the diameter $D_I$ and the length of the inlet I can be utilized as desired for particular applications, with the size of the inlet I affecting the pattern of fluid spray within the nozzle 48 as well as the volumetric flow rate of the fluid F through the nozzle 48.

In some embodiments, grooves 48-46G and 48-46R are optionally provided on the front face of the sprayer-adapter 48-46. The groove 48-46G can be a substantially linearly-extending channel adjoining downstream end of the inlet I, and can have a substantially U-shaped cross-sectional profile having a width and/or depth approximately equal to the diameter $D_I$ and a length that extends across the rearward face adjoining the inner passage 48-46A, with the inlet I located in the middle of the groove 48-46G. Use of the groove 48-46G can promote a fanning-out of the fluid F as the fluid F passes through the nozzle 48 along the primary fluid flow path P. In some embodiments, the groove 48-46G can provide an approximately 15° fan-shaped spray pattern of the fluid F into the barrel 48-1 during operation. The clocking orientation of the groove 48-46G (i.e., its angular orientation) can vary as desired, and need not have any particular orientation. In alternate embodiments, the groove 48-46G can have a different shape in order to change the pattern of the fluid F being emitted into the barrel 48-1 during operation, which in turn will affect how the fluid F is sprayed out of the outlet O. The groove 48-46R can be substantially annular in shape and can have a width and/or depth approximately equal to the diameter $D_I$. The groove 48-46R can have a beveled shape at an outer diameter and a rounded edge at an inner diameter, and can be open to and fluidically communicate with opposite ends of the groove 48-46G. The presence of the grooves 48-46G and 48-46R can create two generally semi-circular "islands" on the front face of the sprayer-adapter 48-46 at opposite sides of the downstream end of the inlet I. In further embodiments, the groove 48-46G could be utilized without the groove 48-46R.

An inner fluid passage 48-4 ends through the barrel 48-1 from the inlet I to an exit E. In the illustrated embodiment, the inner fluid passage 48-4 includes a downstream portion 48-4D, an intermediate portion 48-4I, and an upstream portion 48-4U. Moreover, the inner fluid passage 48-4 can be offset or otherwise asymmetrically arranged relative to a substantially cylindrically shaped body of the barrel 48-1. The upstream portion 48-4U adjoins the inlet I, and the downstream portion 48-4D adjoins the exit E. More particularly, in the illustrated embodiment, the sprayer-adapter 48-46 extends into the inner fluid passage 48-4 in a threaded engagement, with the inlet I positioned concentrically inside the upstream portion 48-4U. The intermediate portion 48-4I is located in between the upstream portion 48-4U and the downstream portion 48-4D in flow series. The upstream portion 48-4U and the downstream portion 48-4D can each be substantially cylindrically shaped with the upstream portion 48-4U having a maximum diameter $D_{U-MAX}$ and a minimum diameter $D_{U-MIN}$ and the downstream portion 48-4D having a diameter $D_D$ at the exit E. The maximum diameter $D_{U-MAX}$ of the upstream portion 48-4U can be smaller than the diameter $D_D$ of the downstream portion 48-4D and the diameter D1 of the inlet I can be smaller than the minimum diameter $D_{U-MIN}$ of the upstream portion 48-4U. The intermediate portion 48-4I can taper, such as in a substantially frusto-conical shape, to link differently sized portions of the inner fluid passage 48-4. In alternate embodiments, the intermediate portion 48-4I could have a stepped configuration. The downstream portion 48-4D and the upstream portion 48-4U can be concentrically arranged about a common central axis, together with the inlet I, such that the primary fluid flow path P can extend from the inlet I through the inner fluid passage 48-4 to the exit E while diverging in the downstream direction. As mentioned above, the diameter $D_I$ of the inlet I can be smaller than the maximum diameter $D_{U-MAX}$ of the upstream portion 48-4U, which effectively causes the primary fluid flow path P to diverge upon exiting the inlet I, such that the fluid F exiting the inlet I is sprayed in an internal spray pattern into the upstream portion 48-4U of the inner fluid passage 48-4 during use. The internal spraying of the fluid F out of the inlet I and into the inner fluid passage 48-4 of the barrel 48-1 may help promote fluid diffusion. The intermediate portion 48-4I can be substantially concentric with the common central axis of the downstream portion 48-4D and the upstream portion 48-4U. The generally diverging shape of the inner fluid passage 48-4 can promote diffusion of the fluid F. In some embodiments, at least part or all of the upstream portion 48-4U can be threaded, to allow threaded engagement with the sprayer-adapter 48-46. As shown in FIG. 4, internal threads of the upstream portion 48-4U that would be visible beyond the section plane are not shown, for simplicity.

A vent (or port) 48-5 can be provided in the barrel 48-1 having a first end 48-5A fluidically connected to the inner fluid passage 48-4 and a second end 48-5B at an exterior of the barrel 48-1. In the illustrated embodiment, the vent 48-5 is substantially cylindrical in shape and arranged substantially (physically) parallel to upstream portion 48-4U of the inner fluid passage 48-4, with the first end 48-5A fluidically connected to the inner fluid passage 48-4 at the intermediate portion 48-4I and the second end 48-5B located at a rear or face of the barrel 48-1 adjacent to and spaced from the inlet I. The vent 48-5 can have a diameter $D_V$. The vent 48-5 can have no direct fluidic connection to the upstream portion 48-4U of the inner fluid passage 48-4. In embodiments where the intermediate portion 48-4I has a tapered or substantially frusto-conical shape, the entire vent 48-5 (from the first end 48-5A to the second end 48-5B) can be arranged radially inside the diameter $D_D$ of the downstream portion 48-4D. Moreover, in some embodiments, the intermediate portion 48-4I and the interface 48-4X can angle the primary fluid flow path P slightly toward the vent 48-5 at or near (e.g., slightly upstream from) the first end 48-5A of the vent 48-5 (e.g., with a 121° angle formed between boundaries of the intermediate portion 48-4I and the downstream portion 48-4D adjacent to the first end 48-5A of the vent 48-5).

Utilizing the venturi effect, flow of the fluid F through the primary fluid path P (i.e., from the inlet I to the exit 48-4E and then an outlet O of the nozzle 48) draws ambient air into the inner fluid passage 48-4 that augments the primary flow of the fluid F, decreasing turbulence and allowing for a more predictable and controlled pattern of fluid discharge spray (e.g., spray of steam and/or water droplets). In that sense, the vent 48-5 allows for a secondary flow path V that, during operation, allows an ambient air flow to be drawn in and combined with the flow of the fluid F in the primary fluid flow path P, creating a combined fluid flow (that includes the fluid F, plus ambient air) which can be considered a combined fluid flow path $P_C$ that incorporates and continues the primary flow path P. The secondary flow path V can be substantially linear in some embodiments. By venting a middle or rear portion of the inner fluid passage 48-4 with the vent 48-5, vapor locking can be reduced or eliminated. Additionally, the vent 48-5 can act as a drain pathway from the primary fluid flow path P out of the nozzle 48 during periods of inactivity and/or storage. Moreover, the vent 48-5 can act as a relief pathway when the outlet O of the nozzle 48 (i.e., the spray discharge end) becomes obstructed due to operator error or over-aggressiveness.

A clip engagement area 48-6 can optionally be provided at an exterior of the barrel 48-1 to facilitate engagement with the clip 66, when desired. The clip engagement area 48-6 can be a substantially cylindrical part of the barrel 48-1 with a substantially smooth surface, and can optionally be bounded by shoulders at opposed lateral boundaries. The clip 66 can be secured to the lance shaft 42, or another suitable part of the assembly 30W and/or 30, such as with a clamp or collar and set-screw engagement. The clip 66 can further include tines that resiliently and/or frictionally engage the clip engagement area 48-6 to removably secure the nozzle 48 when disconnected from the primary fluid flow path P at the quick-disconnect coupler 46. The tether 68, which can be secured to the elbow joint 44 or other part of the assembly 30W, can further be secured to the barrel 48-1 (e.g., at an integrated eyelet at or near the upstream end) or other suitable portion of the nozzle 48 to reduce a risk of loss of the nozzle 48 when disconnected, while still allowing the nozzle 48 to be moved between an operation position connected to the primary fluid flow path P and a stowed position engaged with the clip 66 but disconnected from the primary fluid flow path P.

Fins 48-7 can optionally be provided on an exterior of the barrel 48-1. The fins 48-7 can help promote cooling of the nozzle 48. Keeping the nozzle 48 relatively cool can help reduce risks of damage if the nozzle 48 contacts a nearby object, and also can facilitate removal of the nozzle 48 by an operator while reducing the chance of burns to that operator. In the illustrated embodiment, the clip engagement area 48-6 is located between upstream and downstream arrays of the fins 48-7 but could be located elsewhere on the nozzle 48 in alternate embodiments. The fins 48-7 can be entirely omitted in further embodiments.

In the illustrated embodiment, the sprayer tip cap 48-2 is secured to the barrel 48-1 with one or more threaded fasteners 48-2F (see FIG. 3). However, in further embodiments, the sprayer tip cap 48-2 can instead be engaged with the barrel 48-1 with a direct threaded connection or using another connecting mechanism. Moreover, in still further embodiments, the sprayer tip cap 48-2 could be integrally and monolithically formed with the barrel 48-1, although having a separable sprayer tip cap 48-2 can make fabrication easier. The gasket 48-3 can be positioned between the barrel 48-1 and the sprayer tip cap 48-2, though in further embodiments the gasket 48-3 can be omitted.

The sprayer tip cap 48-2 of the illustrated embodiment is made of metal (e.g., aluminum), has a generally cylindrical shape, and includes an interior (or rear) surface 48-2I and the outlet O. The interior surface 48-2I faces upstream and the inner fluid passage 48-4 (e.g., adjacent to the downstream portion 48-4D). The interior surface 48-2I can be substantially planar. The gasket 48-3 can conform to the shape of the inner surface 48-2I, for example, the gasket 48-3 can also be substantially planar. The gasket 48-3 can be made of a metal (e.g., copper) or another suitable material. Flats can optionally be provided on the barrel 48-1 and/or the sprayer tip cap 48-2 to allow engagement with a tool (e.g., wrench) to facilitate assembly and disassembly of the nozzle 48 and and/or the assembly 30W or 30.

The outlet O can be a substantially cylindrical passage through the sprayer tip cap 48-2 that is fluidically connected to the primary flow path P (and the combined flow path $P_C$ in some embodiments) via the inner fluid passage 48-4. The outlet O can have a diameter Do, and can be substantially concentrically aligned with the downstream portion 48-4D and/or the upstream portion 48-4U of the inner fluid passage 48-4 as well as with the inlet I. Additionally, the gasket 48-3 can include an opening 48-3A that corresponds to the outlet O, allowing the fluid F to pass through the gasket 48-3 along the primary fluid path(s) P and/or $P_C$ and out of the outlet O—and optionally one or more additional openings to accommodate the depth gauge 60, fasteners 48-2F, etc. The opening 48-3A can have a diameter DG, which can be greater than or equal to the diameter Do of the outlet O. During operation, the fluid F can be discharged from the nozzle 48 and the primary flow path P and/or $P_C$ out of the outlet O in a spray direction S. The spray direction S refers to the general focus of the spray of the discharged fluid F leaving the outlet O of the nozzle 48, which is determined at least in part by the orientation of the primary fluid flow path P and/or $P_C$ as well as the shape of the outlet O. Although it should be understood that a spray pattern with some diffusion will generally be produced by the nozzle 48 and arrows shown in the drawings illustrating the spray direction S are for illustrative purposes and are not meant to denote the precise limits of the spray pattern of the discharged fluid F.

In the illustrated embodiment, the diameter Do of the outlet O is smaller than the diameter $D_D$ of the adjacent downstream portion of the inner fluid passage 48-4 and the diameter Do is smaller than a length of the outlet O in the flow direction of the primary fluid flow path P and/or $P_C$ (e.g., the diameter Do can be approximately 66% of the length of the outlet O). In this way, the primary flow path P and $P_C$ diverges within the inner fluid passage 48-4 then converges through the outlet O. The diameter Do of the outlet O can be larger than a diameter of the upstream portion 48-4U of the inner fluid passage 48-4 in some embodiments.

Table 1 illustrates in dimensionless units the relative proportions of diameters of certain passages, openings, and the like in or through the nozzle 48 in one embodiment. Though the dimensions, both in absolute terms and relative to each other, are provided merely by way of example and not limitation. Other dimensions are possible in further embodiments. For instance, the diameter $D_I$ could be increased while keeping all other dimensions as listed in Table 1.

TABLE 1

| Parameter | Approximate Diameter in Dimensionless Units |
|---|---|
| $D_I$ | 0.042 |
| $D_{U-MAX}$ | 0.37 |
| $D_{U-MIN}$ | 0.37 |
| $D_D$ | 0.75 |
| $D_O$ | 0.50 |
| $D_G$ | 0.50 |
| $D_V$ | 0.125 |

The downstream portion 48-4D can be significantly longer (along the primary flow path P and/or $P_C$) than the upstream portion 48-4U, and the intermediate portion 48-4I can be relatively short, in some embodiments. For example, the downstream portion 48-4D can be at least twice as long as the upstream portion 48-4U. The outlet O can have a significant length (along the primary flow path P and/or $P_C$), such as approximately one-third the length of the downstream portion 48-4D.

During operation, the fluids (including the fluid F) traveling along the primary fluid flow path P and/or $P_C$ have a tendency to concentrate along the outer boundary of the inner fluid passage 48-4, particularly by the time such fluids reach the exit E at the downstream portion 48-4D. Because the outlet O (and the opening 48-3A if the gasket 48-3 is present) has a smaller diameter (Do) than the exit diameter ($D_D$) of the downstream portion 48-4D of the inner fluid passage 48-4, the primary fluid flow path P and/or $P_C$ effectively converges through the outlet O helps to diffuse and more evenly distribute the fluid F in the spray pattern. For example, in one embodiment the diameter Do of the outlet O can be approximately 66% of the exit diameter $D_D$ of the downstream portion 48-4D. Although the convergence at the outlet O can be abrupt and step-wise in some embodiments. In that way, some of the fluid F can impinge upon the inner surface 48-2I and/or a corresponding surface of the gasket 48-3 adjacent to the outlet O. The smaller diametric size of the outlet O helps reduce or avoid the concentration of the spray pattern of the fluid F in a quasi-annular pattern with a substantial portion of the fluid F concentrated at an outer edge or perimeter of the spray pattern with relatively less volume of the fluid F at or near a center of the spray pattern, which often occurs with prior art steam spraying nozzles used for ice dam abatement. Instead, the fluid F discharged from the illustrated embodiment of the nozzle 48 tends to be more evenly distributed across the spray pattern. Thus, in the illustrated embodiment, as the fluid F passes through the nozzle 48, the primary fluid flow path P can narrow at the inlet I (compared to a portion of the primary fluid flow path P upstream of the nozzle 48), widen through the barrel 48-1, and then narrow at the outlet O. The venturi effect produced by ambient air drawn in through the vent 48-5 can help reduce turbulence despite the convergence of the combined flow path $P_C$ at the outlet O, in some embodiments.

In the illustrated embodiment, the depth gauge 60 includes a shaft 60-1 and a thermal insulator 60-2 carried on the shaft 60-1. The shaft 60-1 extends from the nozzle 48 in the spray direction S and has a distal end 60-1D and an opposite proximal end 60-1P. More specifically, as shown in the illustrated embodiment, the shaft 60-1 protrudes generally from a distal end face of the nozzle (e.g., from the sprayer tip cap 48-2) adjacent to the outlet O. The shaft 60-1 can extend generally parallel to the spray direction S, and can further extent into or through an outer portion of the spray pattern of the discharged fluid F in some embodiments. At least the proximal end 60-1P of the shaft 60-1 can extend into a slot 70 in the nozzle 48. The shaft 60-1 can be made of a metallic material, or alternatively wholly or party of a non-metallic material. The slot 70 can include portions 70-1, 70-2, and 70-3 in the barrel 48-1, the sprayer tip cap 48-2, and the gasket 48-3, respectively. The shaft 60-1 can be generally cylindrical and elongate, or can have other shapes as desired. The shaft 60-1 can be adjustable in length relative to nozzle 48. That is, a distance from the distal end 60-1D to the outlet O of the nozzle 48 can be adjustable. Depth markings 60-1M can be provided on an exterior surface of the shaft 60-1 in some embodiments to provide a visual indication to an operator regarding a current depth setting of the depth gauge 60. Though in alternate embodiments the shaft 60-1 can be fixed and non-adjustable relative to the nozzle 48.

In the illustrated embodiment, the depth gauge 60 is a single element with a single shaft 60-1, located to one side of the outlet O. As shown, the depth gauge 60 is located at or towards the same side of the assembly 30W as the elbow thermal insulator 64, generally opposite the angle A. In this way, the depth gauge 60 can be located toward a bottom or lower part of the nozzle 48 when the nozzle 48 and the spray direction S are oriented generally parallel to an adjacent substrate (e.g., roof) surface. Use of a single depth gauge 60 can help provide desired standoff functionality while reducing interference with fluid discharged and sprayed from the outlet O.

Additionally, a flat surface 60-1F and one or more adjoining shoulder(s) 60-1S are provided on the shaft 60-1 in the illustrated embodiment. A locking device 72, such as a threaded fastener (e.g., a knurled thumb screw, set screw, or the like) that selectively frictionally engages the flat surface 60-1F or another portion of the shaft 60-1 can be engaged with the nozzle 48 to adjustably secure the depth gauge 60 at a desired depth setting, that is, with a desired distance from the distal end 60-1D to the outlet O. Though in alternative embodiments other types of locking mechanisms can be utilized, such as a cam mechanism, an expansion collar, a clamping collar, or the like. A stop 74 can optionally be secured to the nozzle 48 that extends into the slot 70 adjacent to the flat surface 60-1F, such that the stop limits movement of the shoulder(s) 60-1S to help prevent the shaft 60-1 from slidably disengaging from the nozzle 48. For instance, when the locking device 72 is released or loosened, the stop 74 can contact the shoulder 60-1S adjacent to the proximal end 60-1P to arrest sliding movement of the shaft 60-1 at a maximum limit, while the stop 74 is spaced from flat surface 60-1F to avoid interference with desired adjustment of the depth gauge 60.

It should be noted that the shaft 60-1 and the slot 70 are shown merely by way of example and not limitation, and can have different configurations in further embodiments. For instance, the shaft 60-1 can have a rectangular cross-sectional profile, the flat surface 60-1F could instead be a slot into which the stop 74 protrudes. The slot 70 could also be configured as an open or partly-open channel along an exterior of the nozzle 48 in further embodiments. Moreover, the shaft 60-1 could be secured elsewhere on the nozzle 48 or the assembly 30W with the distal end 60-1D positioned in front of the outlet O in the spray direction S.

The thermal insulator 60-2 is positioned at least at the distal end 60-1D of the shaft 60-1. In the illustrated embodiment, the thermal insulator 60-2 is a thermal ball (or knob) made of a thermoset polymer material with a threaded metallic (e.g., brass) insert that is threadably engaged with the distal end 60-1D of the shaft 60-1, though the ball can have one or more flat or otherwise non-spherical surfaces and can optionally include a protruding shank. For example, in one embodiment, the thermal insulator is a thermoset standard ball knob model No. 4901AN with a 0.67-inch diameter, available from Advance Components (Carrollton, TX). In some embodiments, the thermal insulator 60-2 is a thermal ball (or knob) having a diameter that is greater than a width (e.g., diameter) of the shaft 60-1 and smaller than a width (e.g., diameter) of the nozzle 48 at the outlet O that is fixedly and rigidly secured to the shaft 60-1. The thermal ball can optionally include a shank portion. Use of a thermal ball for the thermal insulator 60-2 in some embodiments can help reduce or minimize the size of a contact area between the thermal insulator 60-2 and the substrate, which helps reduce frictional resistant to sliding the nozzle assembly 48A and other components of the assembly 30W. Though in alternate embodiments, the thermal insulator 60-2 can have other configurations, for instance, as a quasi-cylindrical stopper or the like. Moreover, while the thermal insulator 60-2 is illustrated as being threadably engaged with the shaft 60-1, in further embodiments other attachments are possible. For example, the thermal insulator 60-2 could be overmolded directly onto the shaft 60-1. In still further embodiments, the thermal insulator 60-2 can be integrally and monolithically formed with at least part of the shaft 60-1, such as where at least part of the shaft 60-1 is made of a thermal insulating material and/or where the thermal insulator 60-2 includes a protruding shank that effectively acts as a portion of the shaft 60-1. In still further embodiments, the thermal insulator 60-2 could include a rolling element.

During operation, the depth gauge 60 can provide a standoff distance between the nozzle 48 at or near the outlet O and nearby objects, such as a substrate (e.g., roofing materials) upon which an ice dam has formed. This helps reduce a risk of damage to such nearby objects due to the pressure and temperature of the fluid F discharged from the nozzle 48, but also helps to avoid physical contact between metallic components of the nozzle 48 that get hot during use. The thermal insulator 60-2 also helps to thermally isolate and separate the shaft 60-1 from nearby objects.

The collar 62 can be fit around a portion of the nozzle 48, such as to encircle or at least partially surround the sprayer tip cap 48-2. The collar 62 can be made of a relatively hard polymer material or other thermal insulating material. For example, in one embodiment the collar 62 is made of polyoxymethylene (also known as acetal plastic). In the illustrated embodiment, the collar is secured with a friction element 62-1, such as a set screw, though other attachment mechanisms can be used in further embodiments. The collar 62 helps to thermally insulate the nozzle 48 from nearby objects. Further, the collar 62 can be a relatively abrasion-resistant and/or relatively low friction material, which can help the nozzle 48 move along work surfaces (e.g., asphalt shingles) relatively easily while helping to reduce wear on the nozzle 48. During ice dam abatement operations, the collar 62 may frequently contact abrasive materials, making wear resistance as important as thermal insulation properties, for some applications.

Further, as shown in the illustrated embodiment, the sprayer tip cap 48-2 has a channel 48-2C between a proximal annular ridge 48-2P and a smaller distal annular ridge 48-2D. A rabbet 62-2 in the collar 62 can mate with the proximal annular ridge 48-2R, with an inner surface of the collar 62 resting within the channel 48-2C. The collar 62 can thus be slightly recessed from a distal end of the nozzle 48 by the distal annular ridge 48-2D. Such an arrangement can further help retain the collar 62 on the nozzle 48.

During use, the fluid F is supplied to the wand portion of the assembly 30W, which is held by an operator. For ice dam abatement operations, the fluid F can be steam, with or without entrained liquid water droplets. The operator will hold the assembly 30W in close proximity to an ice dam or other snow and/or ice formation, such as on a roof, while the fluid source 32 can remain at a distance, such as on the ground or other lower elevation location. Initially, the operator can perform a cutting operation on the ice dam or the like, in order to form lines (e.g., a crisscross pattern) in the ice and/or snow to divide up the overall mass of material into "chunks" (e.g., generally rectangular chunks). Such cut lines generally extend from the top of the ice dam through most or all of a depth of the ice dam, in a vertical or near-vertical orientation. For such cutting operations, the operator can, as desired, grasp the insulating sleeve 42-2 of the lance shaft 42, for instance, and pivot a downstream portion of the assembly 30W such that the nozzle 48 and the spray direction S point generally downward toward the ice dam or the like. In such an orientation, the depth gauge 60 protrudes from the nozzle 48 toward the ice dam and the underlying substrate (e.g., the roof including roofing materials such as asphalt shingles). However, due to the swivel connector 40, the grip (and/or trigger mechanism) 38 and a connected hose 34 can remain in an upright orientation, without a need for the operator to hold the grip 38 upside down or otherwise awkwardly and without needing to have the hose 34 extend close to the operator's head or in other awkward or undesirable positions. The operator can also adjust a length or depth of the depth gauge 60 to a desired setting in some embodiments. The operator can spray the fluid F to being the ice dam abatement operation, and as the ice and/or snow melts the nozzle 48 and the depth gauge 60 can be moved closer to the underlying substrate (e.g., the roof). At points during ice cutting actions, the thermal insulator 60-2 at the distal end of the depth gauge 60 can contact the substrate, but the outlet O of the nozzle 48 generally remains spaced from the substrate by a specified distance and the substrate is thermally insulated from relatively hot components of the assembly 30W by the thermal insulator 60-2 as well as ambient air present between the substrate and the outlet O. Such separation and thermal insulation help reduce risks of damage to the substrate while still allowing for relatively efficient spraying of the fluid F, without a need to greatly reduce discharge pressures of the fluid F leaving the outlet O. The assembly 30 and/or 30W therefore helps reduce risks of damage while allowing relatively efficient ice dam abatement ice and/or snow cutting operations with the fluid F. The operator can adjust the depth of the depth gauge 60 between cutting actions as desired.

After at least some initial cutting actions have been performed as part of the ice dam abatement operation, chunks of ice and/or snow can be separated from the underlying substrate (e.g., roof including roofing materials such as asphalt shingles) with undercutting spraying actions. For such undercutting actions, the operator can, as desired, grasp the insulating sleeve 42-2 of the lance shaft 42, for instance, and pivot a downstream portion of the assembly 30W such that the nozzle 48 and the spray direction S point generally parallel to the ice dam or the like as well as generally parallel to the underlying substrate (e.g., roof surface). In such an orientation, the elbow thermal insulator 64 protrudes from the elbow 44 generally toward the underlying substrate (e.g., the roof including roofing materials such as asphalt shingles) and the collar 62 also protrudes from the nozzle 48 toward the substrate. However, due to the swivel connector 40, the grip (and/or trigger mechanism) 38 and a connected hose 34 can remain relatively stable in a normal, upright orientation, despite the nozzle 48 and other downstream portions of the assembly 30W being repositioned. The operator can also adjust the depth of the depth gauge 60, if desired, or can leave the depth gauge 60 at an existing setting. The operator can then move the assembly 30W to discharge the fluid F with the spray direction S extending generally parallel to and relatively close to the substrate and at or near a bottom of the ice and/or snow chunks. Depending on the orientation of the substrate, this generally parallel spraying orientation could be horizontal or could follow an angled slope or pitch of a roof. Operator movement of the assembly 30W can include translating, sliding, and or pivoting the nozzle 48 and/or other portions of the assembly 30W. For example, the collar 62 can slide along the substrate while helping to maintain separation between the relatively hot metallic components of the nozzle 48. Moreover, the elbow thermal insulator 64 can help keep the relatively hot metallic elbow connector 44 as well as other nearby components such as the nozzle 48 from contacting the substrate, and the elbow thermal insulator 64 can optionally be used as a pivot point to pivot the nozzle 48 (and elbow connector 44, etc.) and sweep the spray direction S across an arc. When performing undercutting actions, the depth gauge 60 can be positioned generally below the outlet O. To the extent that the operator tilts the assembly 30W, including the nozzle 48, the depth gauge 60 will be positioned in between the outlet O and the substrate to help maintain a desired standoff distance between the outlet O of the nozzle 48 and the substrate or other nearby objects.

Chunks of ice and/or snow that can been separate from the substrate can then be removed. The ice dam abatement actions described above can then be repeated as needed to sufficiently clear away snow and ice as desired.

Further, the operator can utilize the quick-disconnect coupler 46 to selectively remove and attach the nozzle 48 (and/or the entire nozzle assembly 48A). A different nozzle tip can be used as desired for specific spraying actions, for instance. The tether 68 and the clip 66 can each help to retain the nozzle 48 and/or nozzle assembly 48A when not in use.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational, or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For instance, features described with respect to one embodiment can generally be used with any other disclosed embodiment as desired for particular applications.

The invention claimed is:

1. A fluid spraying assembly comprising:
 a nozzle through which fluid can pass, the nozzle having an inlet and an outlet, wherein the nozzle discharges the fluid out of the outlet in a spray direction during operation; and
 a depth gauge positioned adjacent to the outlet of the nozzle, the depth gauge comprising:
  a shaft extending from the nozzle in the spray direction, wherein the shaft has an elongate shape and a distal end that is spaced from the outlet of the nozzle in the spray direction; and
  a thermal insulator positioned at least at the distal end of the shaft, wherein the thermal insulator comprises a thermal insulating ball having a diameter that is greater than a width of the shaft and smaller than a width of the nozzle at the outlet.

2. The assembly of claim 1, wherein a distance from the distal end of the shaft to the outlet of the nozzle is adjustable.

3. The assembly of claim 2 and further comprising:
 depth markings on an exterior surface of the shaft.

4. The assembly of claim 1 and further comprising:
 a locking device, wherein a portion of the shaft is slidably engaged with the nozzle, and wherein the locking device selectively restricts sliding of the shaft relative to the nozzle to at least temporarily fix a depth of the depth gauge relative to the outlet of the nozzle.

5. The assembly of claim 4, wherein the shaft has a substantially cylindrical shape with flat surface, wherein the locking device comprises a threaded fastener threadably engaged with the nozzle, and wherein the threaded fastener is frictionally engageable with the flat surface of the shaft to restrict sliding of the shaft relative to the nozzle.

6. The assembly of claim 4 and further comprising:
 a shoulder on the shaft; and
 a stop secured to the nozzle, wherein the stop limits movement of the shoulder to prevent the shaft from slidably disengaging from the nozzle.

7. The assembly of claim 1 and further comprising:
 a lance shaft;
 an elbow joint located adjacent to the nozzle and fluidically connected between the nozzle and the lance shaft, wherein the elbow joint positions the nozzle at an obtuse angle relative to the lance shaft; and
 an elbow thermal insulator extending outward from the elbow joint.

8. The assembly of claim 7, wherein the elbow thermal insulator comprises a thermal insulating ball located substantially opposite the obtuse angle.

9. The assembly of claim 1 and further comprising:
 a collar surrounding a portion of the nozzle adjacent to the outlet, wherein the collar comprises a polymer material, and wherein the nozzle comprises a metallic material.

10. The assembly of claim 1 and further comprising:
 a lance shaft;
 an elbow joint fluidically connected to the lance shaft; and
 a clip engaged to the lance shaft configured to permit storage of the nozzle when the nozzle is fluidically disconnected from the lance shaft and the elbow joint.

11. The assembly of claim 1 wherein the nozzle comprises:
 a barrel having a proximal end, a distal end, and an inner fluid passage, wherein the inlet of the nozzle is located at the proximal end of the barrel and fluidically communicates with the inner fluid passage, wherein the inner fluid passage further has an exit at the distal end of the barrel, and wherein the inner fluid passage has an upstream portion having a maximum first diameter and a downstream portion having a second diameter at the exit that is larger than the maximum first diameter; and
 a sprayer tip cap at the distal end of the barrel, wherein the outlet of the nozzle is defined by the sprayer tip cap and the outlet fluidically communicates with the inner fluid passage of the barrel, and wherein a third diameter of the outlet is smaller than the second diameter of the downstream portion of the inner fluid passage of the barrel.

12. The assembly of claim 11, the assembly further comprising:
 a lance shaft fluidically connected to the nozzle;
 a swivel connector fluidically connected to the lance shaft upstream from the nozzle;
 an elbow joint located adjacent to the nozzle and fluidically connected between the nozzle and the lance shaft, wherein the elbow joint positions the nozzle at an obtuse angle relative to the lance shaft;
 a thermal insulator ball extending outward from the elbow; and
 a collar surrounding a portion of the sprayer tip cap adjacent to the outlet, wherein the collar is made of a polymer material.

13. The assembly of claim 11 and further comprising:
 a vent in the barrel having a first end fluidically connected to the inner fluid passage and a second end at an exterior of the barrel.

14. The assembly of claim 1 and further comprising:
 a lance shaft;
 an elbow joint located adjacent to the nozzle and fluidically connected between the nozzle and the lance shaft; and
 a swivel connector fluidically connected to the lance shaft, wherein the swivel connector is located adjacent to a proximal end of the lance shaft and the elbow joint is located adjacent to a distal end of the lance shaft.

15. The assembly of claim 1 and further comprising:
 a steam source, wherein the fluid comprises steam;
 a hose fluidically connected to the steam source;
 a lance shaft fluidically connected to the hose; and
 an elbow joint fluidically connected to the lance shaft, wherein the nozzle is fluidically connected to the elbow joint.

* * * * *